United States Patent
Biwersi et al.

(10) Patent No.: US 10,408,363 B2
(45) Date of Patent: Sep. 10, 2019

(54) VALVE HAVING A CONTROL SLIDE GUIDED IN A VALVE HOUSING SO AS TO BE LONGITUDINALLY MOVABLE

(71) Applicant: HYDAC SYSTEM GMBH, Sulzbach/Saar (DE)

(72) Inventors: Sascha Alexander Biwersi, Mettlach (DE); Marcus Hettiger, Saarlouis (DE); Christoph Stoenner, St. Ingbert (DE)

(73) Assignee: HYDAC SYSTEM GMBH, Sulzbach/Saar (DE)

( * ) Notice: Subject to any disclaimer, the term of this patent is extended or adjusted under 35 U.S.C. 154(b) by 88 days.

(21) Appl. No.: 15/542,449

(22) PCT Filed: Jan. 20, 2016

(86) PCT No.: PCT/EP2016/000097
§ 371 (c)(1),
(2) Date: Jul. 10, 2017

(87) PCT Pub. No.: WO2016/128106
PCT Pub. Date: Aug. 18, 2016

(65) Prior Publication Data
US 2018/0274691 A1   Sep. 27, 2018

(30) Foreign Application Priority Data
Feb. 13, 2015   (DE) .......... 10 2015 001 883

(51) Int. Cl.
*F16K 31/05* (2006.01)
*F16K 11/07* (2006.01)
(Continued)

(52) U.S. Cl.
CPC .......... *F16K 31/05* (2013.01); *F15B 13/0444* (2013.01); *F15B 20/008* (2013.01);
(Continued)

(58) Field of Classification Search
CPC ...... F16K 31/05; F16K 11/07; F15B 13/0444; F15B 20/008; F15B 2211/895; Y10T 137/86622
See application file for complete search history.

(56) References Cited

U.S. PATENT DOCUMENTS 4,190,081 A * 2/1980 Coles .................. F15B 13/0402
                                                   137/624.27
4,437,388 A   3/1984 Budzich
(Continued)

FOREIGN PATENT DOCUMENTS

DE   37 04 312   8/1988
DE   42 37 852   5/1994
(Continued)

OTHER PUBLICATIONS

International Search Report (ISR) dated Apr. 6, 2016 in International (PCT) Application No. PCT/EP2016/000097.

*Primary Examiner* — Reinaldo Sanchez-Medina
*Assistant Examiner* — David Colon-Morales
(74) *Attorney, Agent, or Firm* — Wenderoth, Lind & Ponack, L.L.P.

(57) ABSTRACT

A valve has a control slide (4) guided in a valve housing (6) so as to be longitudinally movable. The control slide selectively connects a plurality of fluid connection points (P, T, A, B) in the valve housing (6) to each other in a fluid-conducting manner or disconnects the fluid connection points from each other, and can be electrically controlled by a stepper motor (2). The control slide (4) can be actuated by an emergency device (34, 52) in the event of a malfunction or failure.

10 Claims, 1 Drawing Sheet

(51) Int. Cl.
*F15B 13/044* (2006.01)
*F15B 20/00* (2006.01)
*F16K 31/04* (2006.01)

(52) U.S. Cl.
CPC ............. *F16K 11/07* (2013.01); *F16K 31/04* (2013.01); *F15B 2211/895* (2013.01); *Y10T 137/86622* (2015.04)

(56) References Cited

U.S. PATENT DOCUMENTS

| | | | | |
|---|---|---|---|---|
| 4,526,342 | A | * | 7/1985 | Wakefield ........... F15B 13/0442 137/625.65 |
| 5,135,030 | A | | 8/1992 | Schoen |
| 7,591,448 | B2 | | 9/2009 | Martin et al. |
| 9,791,065 | B2 | * | 10/2017 | Biwersi ............... F16K 31/1221 |
| 2014/0326908 | A1 | | 11/2014 | Schober et al. |
| 2016/0169401 | A1 | * | 6/2016 | Williams ................ F16K 11/07 251/129.11 |
| 2017/0051841 | A1 | * | 2/2017 | Huynh .................... F16K 11/07 |

FOREIGN PATENT DOCUMENTS

| | | |
|---|---|---|
| DE | 10 2007 031 429 | 1/2009 |
| DE | 20 2011 103 482 | 12/2011 |
| WO | 2012/126767 | 9/2012 |

\* cited by examiner

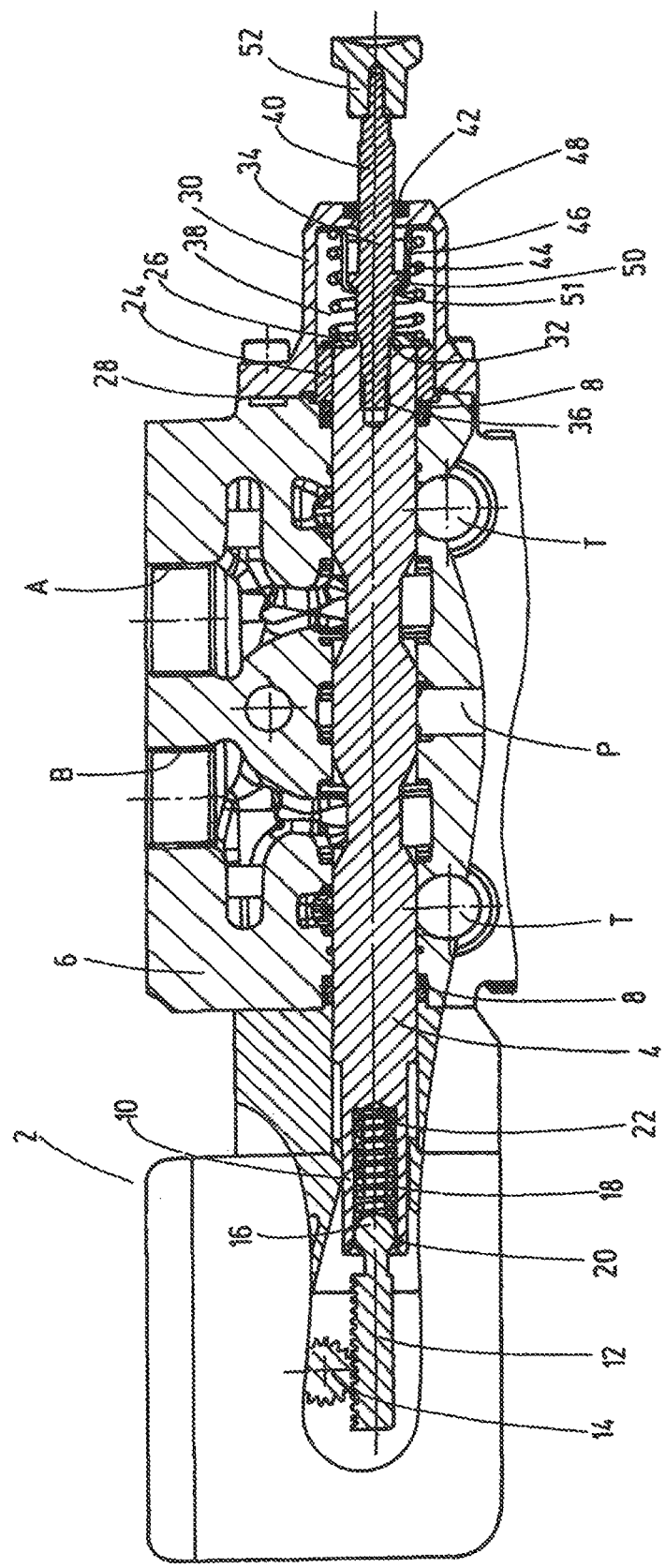

//VALVE HAVING A CONTROL SLIDE GUIDED IN A VALVE HOUSING SO AS TO BE LONGITUDINALLY MOVABLE

FIELD OF THE INVENTION

The invention relates to a valve, having a control slide guided in a valve housing so as to be longitudinally movable. The control slide selectively connects a plurality of fluid connection points in the valve housing to each other in a fluid-conducting manner or disconnects the fluid connection points from each other, and can be electrically controlled by means of a step motor.

BACKGROUND OF THE INVENTION

In the case of valves for hydraulic applications, various types of actuation have been developed over time, ranging from a purely manual control with a manual lever to direct electromagnetic control or hydraulic pilot control to highly dynamic servo drives. As a further type of valve actuation, electromechanical control by a step motor has recently been added in the prior art. U.S. Pat. No. 7,591,448 B2 discloses a solution to this effect for a valve of the type mentioned at the outset. Such solutions are increasingly being used for mobile applications such as construction machines, agricultural machines, forklifts, cranes or other machines.

However, these solutions do not always meet the requirements in terms of safety, because, in the event of a step motor failure or a failure of the electrical system, the valve is returned to a safe neutral position. There is the risk that the related machine then cannot be brought into a safe state and remains in a state endangering the environment.

SUMMARY OF THE INVENTION

In view of this risk, the invention addresses the problem of providing a valve of the type mentioned in the introduction, which avoids the risk of endangerment in case of such a fault. According to the invention, this problem is solved using a valve where the control slide can be actuated by an emergency device in the event of a fault or failure. Irrespective of the rotational position of the step motor, in this way the control slide can be brought into a position, in which the machine can be controlled and/or put in a safe state.

Particularly advantageously, a manually operable emergency device can be provided, so that an operator can effect a direct intervention. In the event of required safety measures, it is then not necessary to resort to an operating device, which may in turn be susceptible to failure.

In particularly advantageous embodiments, the free end of the control slide is connected to a control rod. The free end of the control rod is guided out of the valve housing, permitting a manual actuation, preferably via an emergency button arranged at the free end of the control rod. In this way, a simple and compact emergency device can be implemented.

In the case of particularly advantageous exemplary embodiments, the control rod of the emergency device passes through an energy storage device, in particular in the form of a compression spring. The free end of the compression spring is supported by a guide of the control slide or by parts thereof. The other end of the compression spring rests on a mounting sleeve, which is also penetrated by the control rod.

The arrangement can be such that the mounting sleeve has a reduction of cross-section at its free end, forming an end stop for the control rod of the emergency device. The emergency device is provided with an enlargement of cross-section and is guided in an end cap of the valve housing so as to be displaceable against the end stop. The axial length of the mounting sleeve can be selected such that upon the control rod reaching the end stop, the control slide attains its blocking position. The control slide in the blocking position separates the fluid connection points in the valve housing from one another. This can be a centered zero position of the control slide, corresponding to the safe state.

The axial length of the mounting sleeve can further advantageously be selected such that, when the enlargement of cross-section of the control rod is moved away from the step motor, the control slide assumes another operating position different from the blocking position and opposed to the effect of the energy storage device. At least some of the fluid connection points are then connected to one another. In the opposite direction of movement of the control rod towards the step motor, the mounting sleeve is lifted from its additional stop position at the end cap by the enlargement of cross-section bearing on the end stop against the effect of the energy storage device. The control slide reaches, in following the movement of the control rod, another operating position, which is different from the blocking position and from the operating position, in which at least some of the fluid connection points are connected to one another.

To actuate the valve by means of a step motor, the control slide is preferably movably mounted between a toothed rack of the step motor and the control rod of the emergency device in the valve housing. The toothed rack is in meshed engagement with a pinion coupled to the step motor.

With regard to the design of the valve housing, particularly advantageously, the control slide passes through a bipartite guide with a guide part for end-side longitudinal guiding of the control slide in this region. A control disk is supported by the guide part and forms a support for supporting one end of the energy storage device of the emergency device.

This valve can advantageously be designed as a 4/3-way slide valve, with the valve housing having fluid connection points in the form of a pressure supply connection, two tank connections and two service connections for this purpose.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure:

FIG. 1 is a side view in cross section of a valve according to an exemplary embodiment of the invention, with only a pinion at the output side and a toothed rack of the associated step motor being shown.

DETAILED DESCRIPTION OF THE INVENTION

With reference to FIG. 1, the invention is illustrated by using the example of a 4/3-way slide valve, which can be electrically actuated, without hydraulic pilot control, according to the prior art disclosed in the U.S. Pat. No. 7,591,448 B2 by a step motor 2. A control slide 4 is guided in the valve housing 6 in a longitudinally displaceable manner and is shown in FIG. 1 in its centered zero position, corresponding to the safe state of a connected system in which all fluid connections located at the valve housing 6, namely a pressure port P, service ports A, B and tank ports T are separated from one another. To prevent the control slide 4 from being pressurized under operating conditions at its front faces by leakage flows, which would result in unwanted positioning forces on the control slide 4, the two end regions of the control slide 4 are led or extend out of the valve housing 6 through sealing elements or seals 8. For the actuation by the step motor 2, the end region 10 of the slide 4, on the left hand side in FIG. 1, is connected to the toothed rack 12 of the step motor 2. Step motor 2 moves the toothed rack 12 translatively or translationally via a toothed wheel 14 in accordance with the aforementioned state of the art. For coupling the end region 10 to the toothed rack 12, the toothed rack 12 has a ball head 16 at the connection end. Ball head 16 engages into a coaxial blind hole 18 in the end region 10 and is safeguarded from exiting the blind hole 18 by a snap ring 20. A compression spring 22 is located in the blind bore 18 for the purpose of backlash-free contact of the ball head 16 on the snap ring 20.

On its end region opposite the step motor 2, the control slide 4 is led or extends out of the valve housing 6 via a bipartite guide device. This guide device has a guide sleeve 24 forming the actual longitudinal guide for the control slide 4. Guide sleeve 24 adjoins the sealing element 8 at the outer end of the valve housing 6. A control disk 26 abuts the outside axial end of the guide sleeve 24. The part of the guide sleeve 24 protruding from the end of the valve housing 6 is enclosed by the connecting flange 28 of a housing end cap 30, which is screwed to the end of the valve housing 6. The control disk 26 has a central opening 32 through which a control rod 34 extends. Control rod 34 is screwed to the control slide 4 via a threaded bore 36. The control rod 34 extends through the interior 38 of the end cap 30, which forms a circular cylindrical spring housing, and emerges from the end cap 30 through a sealing element 42 situated at the end of the end cap 30 with a protruding actuating section 40.

An energy storage device in the form of a compression spring 44 has one end supported on the control disk 26, which forms a support and bears against the front end of the control slide 4, and is located in the interior 38 of the end cap 30. The compression spring 44 surrounds the control rod 34 and the outside of a mounting sleeve 46 penetrated by the control rod 34. Mounting sleeve 46 has, at its end opposite from the control slide 4, a radially outwardly protruding rim 48 forming the second support of the compression spring 44. In the state shown in FIG. 1 corresponding to the centered zero position and a safe state of the valve, the end rim 48 of the mounting sleeve 46 rests against the end cap 30 at the end of the interior 38. Simultaneously the enlargement 50 of the cross section of the control rod 34 abuts the inner rim of the through-hole 51 of the mounting sleeve 46. The through-hole 51 has a reduced diameter in comparison to enlargement 50. If, during a control movement, the control slide 4 is actuated from the depicted zero position in the direction of the step motor 2 to connect the pressure port P to the service port A and a tank port T to the service port B, then the mounting sleeve 46, entrained by the enlargement of cross-section 50 of the control rod 34, is lifted from the abutment at the end of the end cap 30. As a result, the control slide 4 moves to the left in FIG. 1 against the action of the compression spring 44.

If the control slide 4 is actuated out of the illustrated zero position for a movement directed away from the step motor 2, the enlargement of cross-section 50 is lifted from the rim of the opening 51 of the mounting sleeve 46 and moves to the right within the mounting sleeve 46 in FIG. 1. This movement is effected against the action of the compression spring 44 as the support formed by the control disk 26 moves to the right with the control slide 4. The axial length of the mounting sleeve 46 is dimensioned such that the control slide 4 can be displaced sufficiently far to connect the pressure port P to the service port B and the service port A to a tank port T.

As mentioned above, the control rod 34 is led or extends out of the end cap 30 with the actuating section 40 and is then accessible for an emergency actuation of the valve. In the illustrated example, an emergency button 52 attached to the end of the actuating section 40 of the control rod 34 is arranged for direct manual emergency operation. The design shown, in which the control rod 34 and the actuating section 40 are formed in one piece, is not compulsory. The actuating section 40 could be a separate adapter part, which is screwed to the remaining part of the control rod 34, for instance. Another option would be designing control slider 4 itself in such a way that it protrudes from the end cap 30 forming the spring housing and can itself be used as an actuating part for emergency actuation. Because, as mentioned above, unlike in hydraulically controlled systems, the interior 38 of the end cap 30 is not pressurized owing to the sealing of the control slide 4 by the sealing elements 8 provided at the housing end. A simple sealing ring 42 can then be provided where the control rod 34 exits the end cap. An end cap as only a seal against splashing water or dirt carried in from the outside has to be provided.

While one embodiment has been chosen to illustrate the invention, it will be understood by those skilled in the art that various changes and modifications can be made therein without departing from the scope of the invention as defined in the claims.

What is claimed is:

1. A valve, comprising; a valve housing having a plurality of connection points therein and having a longitudinal axis; a control slide guided for axial movement in said valve housing along said longitudinal axis and selectively connecting and disconnecting said connection points in fluid communication; an electrical step motor having a toothed rack coupled to a first axial end of said control slide and controlling axial movement of said control slide in said valve housing, said toothed rack being in meshed engagement with a pinion of said step motor; an emergency device coupled to and activating said control slide to move axially along longitudinal axis in said valve housing upon a malfunction or a failure, said emergency device including a manually actuatable control rod fixedly connected to a second axial end of said control slide opposite said first axial end; and an emergency button fixedly connected on a free axial end of said control rod remote from said control slide.

2. A valve according to claim 1 wherein said control rod extends through an energy storage, a first free end of said energy storage being supported by a guide receiving said control slide and a second free end resting on a mounting sleeve penetrated by said control rod.

3. A valve according to claim 2 wherein
said energy storage comprises a compression spring.

4. A valve according to claim 2 wherein
said mounting sleeve comprises a free end with a reduced cross section forming an end stop for said control rod, said control rod having an enlarged cross-sectional part guided for axial movement along said longitudinal axis in an end cap of said valve housing and being displaceable against said end stop.

5. A valve according to claim 4 wherein
said mounting sleeve has an axial length along said longitudinal axis such that said control slide attains a blocking position separating and preventing fluid communication between all said connection points from one another in said valve housing upon said enlarged cross-section part of said control rod engaging said end stop.

6. A valve according to claim 5 wherein said axial length of said mounting sleeve enables said control slide to assume a first operating position spaced axially along said longitudinal axis from the blocking position and opposed to biasing of said energy storage connecting at least some connection points in fluid communication to one another when said enlarged cross-sectional part of said control rod is moved away from said step motor.

7. A valve according to claim 6 wherein said mounting sleeve is liftable from a sleeve stop position engaging said end cap by said enlarged cross-sectional part of said control rod bearing on said end stop against biasing of said energy storage following movement of said control rod towards said step motor to a second operating position spaced axially along said longitudinal axis from the blocking position and the first operating position connecting at least some of said fluid connection points in fluid communication.

8. A valve according to claim 1 wherein
said control slide extends through a bipartite guide having a guide part providing end-side longitudinal guiding of said control slide along said longitudinal axis and having a control disk supported by said guide part being a support for one end of an energy storage of said emergency device.

9. A valve according to claim 1 wherein
the valve is a 4/3-way valve; and
said connection points in said valve housing comprise a pressure port, two tank ports and two service ports.

10. A valve according to claim 1 wherein
said toothed rack, said control slide and said control rod extend coaxially along said longitudinal axis.

* * * * *